(12) United States Patent
Zheng

(10) Patent No.: US 11,340,499 B2
(45) Date of Patent: May 24, 2022

(54) CHROMATICITY OPTIMIZATION METHOD FOR LIQUID CRYSTAL DISPLAY AND LIQUID CRYSTAL DISPLAY DEVICE

(71) Applicant: WUHAN CHINA STAR OPTOELECTRONICS TECHNOLOGY CO., LTD., Wuhan (CN)

(72) Inventor: Yingbo Zheng, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 583 days.

(21) Appl. No.: 16/344,654

(22) PCT Filed: Dec. 28, 2018

(86) PCT No.: PCT/CN2018/124838
§ 371 (c)(1),
(2) Date: Apr. 24, 2019

(87) PCT Pub. No.: WO2020/019672
PCT Pub. Date: Jan. 30, 2020

(65) Prior Publication Data
US 2021/0364863 A1    Nov. 25, 2021

(30) Foreign Application Priority Data
Jul. 24, 2018  (CN) .......................... 201810820047.0

(51) Int. Cl.
*G02F 1/1335*    (2006.01)
*G02F 1/1333*    (2006.01)
(Continued)

(52) U.S. Cl.
CPC ...... *G02F 1/133624* (2021.01); *G02F 1/1309* (2013.01); *G02F 1/133354* (2021.01); *G02F 1/133603* (2013.01)

(58) Field of Classification Search
CPC ......... G02F 1/133624; G02F 1/133354; G02F 1/1309
See application file for complete search history.

(56) References Cited

U.S. PATENT DOCUMENTS

| 2007/0268429 A1 | 11/2007 | So |
| 2009/0128578 A1* | 5/2009 | Feng ...................... G09G 5/026 345/600 |

FOREIGN PATENT DOCUMENTS

| CN | 101477275 A | 7/2009 |
| CN | 105954893 A | 9/2016 |

(Continued)

*Primary Examiner* — Mariceli Santiago
(74) *Attorney, Agent, or Firm* — Osha Bergman Watanabe & Burton LLP

(57) ABSTRACT

The present invention discloses a chromaticity optimization method for a liquid crystal display and the liquid crystal display. Since there are different combinations between liquid crystal panels and backlight units, a cross-matching operation is conducted to get optimized results in matching pairs each made up of one of the liquid crystal panels and one of the backlight units, so that chromaticity coordinates (x, y) at a white point of each assembled liquid crystal display have a tolerance range of ±0.015. This effectively improves chromaticity errors of the assembled liquid crystal display and can be implemented in automated production.

13 Claims, 3 Drawing Sheets

(51) Int. Cl.
*G02F 1/13* (2006.01)
*G02F 1/13357* (2006.01)

(56) References Cited

FOREIGN PATENT DOCUMENTS

| | | | | |
|---|---|---|---|---|
| CN | 108732808 A | * | 11/2018 | |
| KR | 20110073338 A | * | 6/2011 | ......... G02F 1/13338 |
| WO | 2016/105222 A1 | | 6/2016 | |

* cited by examiner

CHROMATICITY OPTIMIZATION METHOD FOR LIQUID CRYSTAL DISPLAY AND LIQUID CRYSTAL DISPLAY DEVICE

FIELD OF DISCLOSURE

The present invention relates to a field of liquid crystal displays and in particular, to a chromaticity optimization method for a liquid crystal display which reduces a chromaticity tolerance, and to a liquid crystal display device.

DESCRIPTION OF RELATED ART

A liquid crystal display (LCD) generally uses a light emitting diode (LED) as a backlight unit (BLU) and a color filter (CF) of a liquid crystal panel to display images and pictures. Due to errors in a die and a packaging process of the LED, small differences in thickness of the color filters in a cell process, slight variations in electrical deflection properties of sub-pixels, and small variations in chromaticity of backlight films, light guide plates and the like, overall chromaticity coordinates at a white point of the liquid crystal display have a larger tolerance (x, y; CIE1931) range. The chromaticity coordinates at the white point have a present tolerance ranging from ±0.03 to ±0.05, so white screens displayed by the liquid crystal displays are obviously different from one another.

In conventional techniques, an assembly process of the liquid crystal display is as follows: feeding materials needed for a cell process→conducting a cell test→bonding an integrated circuit→bonding a flexible printed circuit board-→conducting a panel test→randomly matching each of liquid crystal panels with a backlight unit→testing a final liquid crystal display. Currently, the backlight unit has a chromaticity tolerance range: x±0.015, y±0.015. The liquid crystal panel itself also has a tolerance for chromaticity, so randomly matching and combining each of the liquid crystal panels with any backlight unit to form a liquid crystal display will result in a greater chromaticity tolerance. A chromaticity tolerance range for the chromaticity coordinates (x, y) at the white point is typically ±0.040. However, as specifications of the liquid crystal display device are improved, a chromaticity tolerance range of ±0.03 to ±0.05 for the chromaticity coordinates at the white point, no longer satisfies the requirement.

In the conventional techniques, the chromaticity tolerance is reduced by using techniques as follows: for the backlight unit, each of the LEDs is provided with a bin label to reduce the chromaticity tolerance of the backlight unit; for the liquid crystal panel, a 3gamma programming scheme is adopted, and a penetration ratio of each pixel of a cell is adjusted to correct the chromaticity; and after using the foregoing schemes, the tolerance range of the chromaticity coordinates at the white point of the liquid crystal display can be optimized to x/y±0.025 (CIE1931).

At present, factories (for mobile phones, TVs, and etc.) need to use higher level specifications on chromaticity, but the conventional techniques can only achieve the chromaticity tolerance range of x/y±0.025 for the chromaticity coordinates at the white point of the liquid crystal display. Therefore, in manufacturing the liquid crystal display, there is an urgent need to find a technical solution on how to further reduce the chromaticity tolerance of the chromaticity coordinates at the white point of the liquid crystal display.

SUMMARY

The present invention aims to provide a chromaticity optimization method for a liquid crystal display and the liquid crystal display, which reduces a chromaticity tolerance of chromaticity coordinates at a white point of the liquid crystal display, and can be used in automated production.

Accordingly, the present invention provides a chromaticity optimization method for a liquid crystal display, the color optimization method comprising following steps:

coding a plurality of liquid crystal panels and a plurality of backlight units with cell identifications (IDs) before manufacturing, so that each liquid crystal panel and each backlight unit obtain respective corresponding ones of the cell IDs;

prior to assembling of the liquid crystal display, performing a transmission spectrum test on each liquid crystal panel to obtain a transmission spectrum of each liquid crystal panel and performing a spectrum test on each backlight unit to obtain a spectrum of each backlight unit;

recording the cell ID and transmission spectrum data of each liquid crystal panel and recording the cell ID and spectrum data of each backlight unit;

uploading for storage to a database the cell ID and the transmission spectrum data of each liquid crystal panel and uploading for storage to the database the cell ID and the spectrum data of each backlight unit; and during assembling of the liquid crystal display, performing a cross-matching operation on the transmission spectrum of each liquid crystal panel and the spectrum of each backlight unit to find a plurality of matching pairs for assembling, each matching pair being made up of one of the liquid crystal displays and one of the backlight units which make chromaticity coordinates at a white point of the liquid crystal display closest to a specified central value;

wherein the cross-matching operation comprises: obtaining the transmission spectrum of each liquid crystal panel; when the transmission spectrum of an obtained one of the liquid crystal panels is determined to be within a first transmission spectrum range, matching this liquid crystal panel with one of the backlight units whose spectrum is within a second spectrum range; when the transmission spectrum of the obtained one of the liquid crystal panels is determined to be within a predetermined standard transmission spectrum range, matching this liquid crystal panel with one of the backlight units whose spectrum is within a predetermined standard spectrum range; when the transmission spectrum of the obtained one of the liquid crystal panels is determined to be within a second transmission spectrum range, matching this liquid crystal panel with one of the backlight units whose spectrum is within a first spectrum range;

wherein the first transmission spectrum range is higher than the predetermined standard transmission spectrum range, the predetermined standard transmission spectrum range is higher than the second transmission spectrum range, the first spectrum range is higher than the predetermined standard spectrum range, and the predetermined standard spectrum range is higher than the second spectrum range.

Accordingly, the present invention provides a chromaticity optimization method for a liquid crystal display, the chromaticity optimization method comprising: during assembling of the liquid crystal display, performing a cross-matching operation on a transmission spectrum of each of a plurality of liquid crystal panels and a spectrum of each of a plurality of backlight units and thereby obtaining a plurality of matching pairs for assembling, wherein each matching pair is made up of one of the liquid crystal panels and one of the backlight units which make chromaticity coordinates at a white point of the liquid crystal display closest to a specified central value.

Accordingly, the present invention provides a liquid crystal display device, wherein a liquid crystal display of the liquid crystal display device is manufactured using a chromaticity optimization method for the liquid crystal display: during assembling of the liquid crystal display, performing a cross-matching operation on a transmission spectrum of each of a plurality of liquid crystal panels and a spectrum of each of a plurality of backlight units to find a plurality of matching pairs, wherein each matching pair is made up of one of the liquid crystal panels and one of the backlight units which make chromaticity coordinates at a white point of the liquid crystal display closest to a specified central value.

Advantages of the present invention are as follows. Since there are different combinations between the liquid crystal panels and the backlight units, a cross-matching operation is performed to get optimized results in the matching pairs, and each matching pair is made up of one of the liquid crystal panels and one of the backlight units which make the chromaticity coordinates (x, y) at the white point of the liquid crystal display have a tolerance range of ±0.015 after assembly. This effectively improves chromaticity errors of the liquid crystal display after assembly and can be implemented in automated production.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, a person having ordinary skill in this field can obtain other figures according to these figures without an inventive work or paying the premise.

DETAILED DESCRIPTION OF EMBODIMENTS

Figure 1:
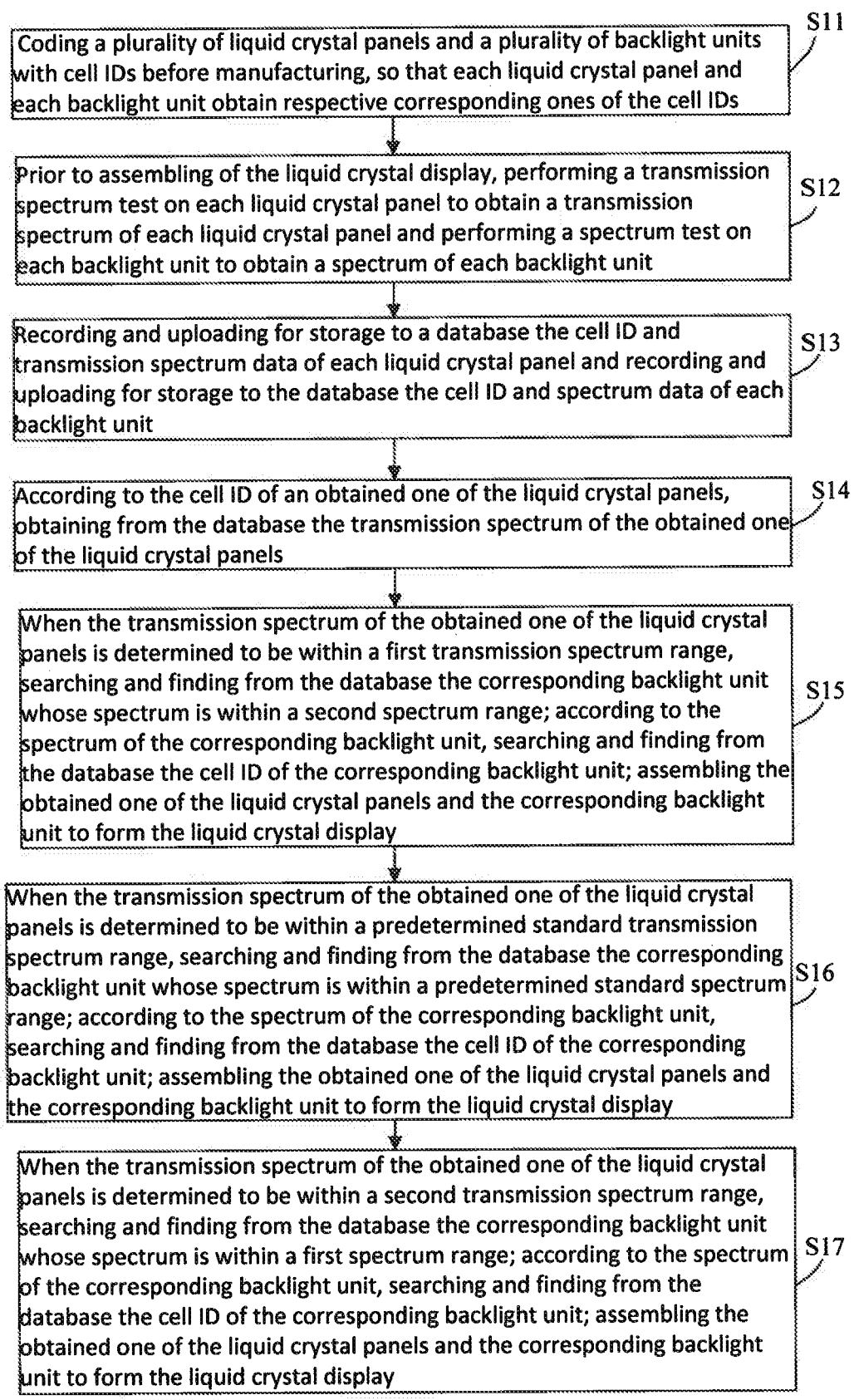
FIG. 1 is a process flow diagram illustrating a chromaticity optimization method for a liquid crystal display (LCD) according to a first embodiment of the present invention.

Embodiments of the present invention are described in detail below, and the examples of the embodiments are illustrated in the accompanying drawings, wherein the same or similar reference numerals are used to refer to the same or similar elements or elements having the same or similar functions. The embodiments described below with reference to the drawings are intended to be illustrative of the invention but are not to be construed as limiting.

In the present invention, unless otherwise specifically defined or stated, a first element being "on" or "under" a second element can mean that the first element is in direct contact with the second element or can mean that the first element is not in direct contact with the second element, and the first element contacts the second element via another element between them. Besides, the first element being "over" the second element means that the first element is right above or diagonally above the second element, or merely means that the first element is at a level higher than the second element. The first element being "below" or "under" the second element means that the first element is right under or diagonally under the second element, or merely means that the first element is at a level lower than the second element.

The following disclosure provides many different embodiments or examples for implementing different structures of the present invention. In order to simplify the disclosure of the present invention, components and configurations of specific examples are described below. Of course, the examples are for illustrative purposes only and are not intended to limit the present invention. In addition, the same reference numerals and/or letters may be used in the different examples for the purpose of simplicity and clarity, and are in no way intended to specify the relationship between various embodiments and/or configurations discussed. Moreover, although the present invention provides various examples in regard to particular processes and materials, one of ordinary skill in the art will deduce other processes and/or other materials for similar applications.

The present invention provides a chromaticity optimization method for a liquid crystal display (LCD). During assembling of the liquid crystal display, a cross-matching operation is performed on a transmission spectrum of each liquid crystal panel and a spectrum of each backlight unit (BLU) to find a plurality of matching pairs for assembling, wherein each matching pair is made up of one of the liquid crystal panels and one of the backlight units which make chromaticity coordinates at a white point of the liquid crystal display closest to a specified (specified in specifications) central value.

A specific principle of the present invention is as follows: performing a cross-matching operation according to a high-low matching principle to find a plurality of matching pairs, in which one of the liquid crystal panels having a low transmission spectrum is matched with one of the backlight units having a high spectrum. By assembling a matching pair for spectrum optimization, instead of randomly assembling each liquid crystal panel to any backlight unit, an error in dispersion of chromaticity of the liquid crystal display can be converged to x/y±0.015, that is, a chromaticity tolerance of the chromaticity coordinates (x, y) at the white point of the liquid crystal display is reduced from ±0.025 to ±0.015.

In detail, the cross-matching operation further comprises: obtaining the transmission spectrum of an obtained one of the liquid crystal panels; when the transmission spectrum of the obtained one of the liquid crystal panels is determined to be within a first transmission spectrum range, matching the obtained one of the liquid crystal panels with one of the backlight units whose spectrum is within a second spectrum range; when the transmission spectrum of the obtained one of the liquid crystal panels is determined to be within a predetermined standard transmission spectrum range, matching the obtained one of the liquid crystal panels with one of the backlight units whose spectrum is within a standard spectrum range; and when the transmission spectrum of the obtained one of the liquid crystal panels is determined to be within a second transmission spectrum range, matching the obtained one of the liquid crystal panels with one of the backlight units whose spectrum is within a first spectrum range; wherein the first transmission spectrum range is higher than the predetermined standard transmission spectrum range, the predetermined standard transmission spectrum range is higher than the second transmission spectrum range, the first spectrum range is higher than the predetermined standard spectrum range, and the predetermined standard spectrum range is higher than the second spectrum range.

After the transmission spectrum of the obtained liquid crystal panel is obtained, it is determined whether the transmission spectrum of the obtained liquid crystal panel is within a first transmission spectrum range, a predetermined standard transmission spectrum range, or a second transmission spectrum range. The first transmission spectrum range, the predetermined standard transmission spectrum range, and the second transmission spectrum range can be set according to customers' demands. For example, a tolerance range of the transmission spectrum can be set to be within ±0.015 as a predetermined standard transmission spectrum range. After determining within what range the transmission spectrum of the obtained one of the liquid crystal panel is, one of the backlight units with a suitable spectrum is looked for to match the transmission spectrum. The first spectrum range, the predetermined standard spectrum range, and the second spectrum range can be set according to customers' demands. For example, a tolerance range of the spectrum can be set to be within ±0.015 as a predetermined standard spectrum range. An optical instrument can be used to measure the transmission spectrum at a specified point of a liquid crystal panel and the spectrum at a specified point of a backlight unit. The optical instrument is, for example, a colorimeter available on the market; the specified point is generally a center point of the liquid crystal panel (or a center point of the backlight unit); and the transmission spectrum (or the spectrum) at the center point is measured. However, the present invention is not limited in this regard. The specified point and the transmission spectrum (or the spectrum) corresponding thereto may be appropriately set according to various conditions of the liquid crystal panel.

It is preferable that, the transmission spectrum of each liquid crystal panel and the spectrum of each backlight unit are buffer-stored in an assembling buffer area of an assembling device used for assembling of the liquid crystal display. In this way, during assembling of the liquid crystal display, the cross-matching operation can be performed to find the plurality of matching pairs based on the transmission spectrum of each liquid crystal panel and the spectrum of each backlight unit which are buffer-stored in the assembling buffer area, and each matching pair is made up of one of the liquid crystal panels and one of the backlight units which make the chromaticity coordinates at the white point of the liquid crystal display closest to the specified central value.

It is preferable that, a database providing a backstage support function can be added, so that a cell identification (ID) and transmission spectrum data of each liquid crystal panel, and a cell ID and spectrum data of each backlight unit are uploaded to the database for storage. During assembling of the liquid crystal display, according to the cell ID of each liquid crystal panel, the corresponding transmission spectrum data are downloaded from the database, and according to the cell ID of each backlight unit, the corresponding spectrum data are downloaded from the database, and the cross-matching operation is performed on the transmission spectrum data of each liquid crystal panel and the spectrum data of each backlight unit. The downloaded data can be buffer-stored in the assembling buffer area of the assembling device.

Preferably, the liquid crystal panels and the backlight units are coded with the cell IDs before manufacturing, so that each liquid crystal panel and each backlight unit obtain respective corresponding ones of the cell IDs; and prior to assembling of the liquid crystal display, a transmission spectrum test is performed on each liquid crystal panel to obtain and record the transmission spectrum of each liquid crystal panel, and a spectrum test is performed on each backlight unit to obtain and record the spectrum of each backlight unit.

Conventional techniques can only achieve a tolerance range of ±0.025 for the chromaticity coordinates at the white point of the liquid crystal display. As it is difficult to further reduce the chromaticity tolerance, the present invention aims to provide a solution to this problem in an aspect of different combinations between the liquid crystal panels and the backlight units, and performing the cross-matching operation to get optimized results in the matching pairs made up of one of the liquid crystal panel and one of the backlight units, so that the chromaticity coordinates (x, y) at the white point of each liquid crystal display have a tolerance range of ±0.015 after assembling of the liquid crystal display is accomplished. This effectively improves chromaticity errors of the liquid crystal display after assembly is accomplished and can be implemented in automated production.

Please refer to FIG. 1, which is a process flow diagram illustrating a chromaticity optimization method for a liquid crystal display according to a first embodiment of the present invention. The chromaticity optimization method comprises steps as follows:

step S11: coding a plurality of liquid crystal panels and a plurality of backlight units with cell IDs before manufacturing, so that each liquid crystal panel and each backlight unit obtain respective corresponding ones of the cell IDs;

step S12: prior to assembling of the liquid crystal display, performing a transmission spectrum test on each liquid crystal panel to obtain a transmission spectrum of each liquid crystal panel and performing a spectrum test on each backlight unit to obtain a spectrum of each backlight unit;

step S13: recording and uploading the cell ID and the transmission spectrum data of each liquid crystal panel to a database for storage and recording and uploading the cell ID and spectrum data of each backlight unit to the database for storage;

step S14: according to the cell ID of an obtained one of the liquid crystal panels, obtaining from the database the transmission spectrum of the obtained one of the liquid crystal panels;

step S15: when the transmission spectrum of the obtained one of the liquid crystal panels is determined to be within a first transmission spectrum range, searching and finding from the database the corresponding backlight unit whose spectrum is within a second spectrum range; according to the spectrum of the corresponding backlight unit, searching and finding from the database the cell ID of the corresponding backlight unit; assembling the obtained one of the liquid crystal panels and the corresponding backlight unit to form the liquid crystal display;

step S16: when the transmission spectrum of the obtained one of the liquid crystal panels is determined to be within a predetermined standard transmission spectrum range, searching and finding from the database the corresponding backlight unit whose spectrum is within a predetermined standard spectrum range; according to the spectrum of the corresponding backlight unit, searching and finding from the database the cell ID of the corresponding backlight unit;

assembling the obtained one of the liquid crystal panels and the corresponding backlight unit to form the liquid crystal display; and step S17: when the transmission spectrum of the obtained one of the liquid crystal panels is determined to be within a second transmission spectrum range, searching and finding from the database the corresponding backlight unit whose spectrum is within a first spectrum range; according to the spectrum of the corresponding backlight unit, searching and finding from the database the cell ID of the corresponding backlight unit; assembling the obtained one of the liquid crystal panels and the corresponding backlight unit to form the liquid crystal display;

wherein the first transmission spectrum range is higher than the predetermined standard transmission spectrum range, the predetermined standard transmission spectrum range is higher than the second transmission spectrum range, the first spectrum range is higher than the predetermined standard spectrum range, and the predetermined standard spectrum range is higher than the second spectrum range. The first transmission spectrum range, the predetermined standard transmission spectrum range, the second transmission spectrum range, the first spectrum range, the predetermined standard spectrum range, and the second spectrum range can be appropriately set according to customers' demands.

Before manufacturing, the liquid crystal panels and the backlight units are coded, so that each of them is given one of the cell IDs as identification information; prior to assembling of the liquid crystal display, the transmission spectrum test is performed on each liquid crystal panel, and the spectrum test is performed on each backlight unit; the database providing the backstage support function is added to keep the cell ID and the transmission spectrum data of each liquid crystal panel and to keep the cell ID and the spectrum data of each backlight unit; during assembling of the liquid crystal display, data corresponding to the cell ID of each of the liquid crystal panels and the backlight units are downloaded in real time from the database to facilitate the cross-matching operation. Through the cross-matching operation which is performed on the transmission spectrum of each of the liquid crystal panels and the spectrum of each of the backlight units according to a high-to-low matching principle. According to the transmission spectrum of the obtained one of the liquid crystal panels, the backlight unit having the most suitable spectrum is found. As a result, the chromaticity coordinates of the liquid crystal display after assembly are even closer to the specified central value, and the chromaticity tolerance for the chromaticity coordinates (x, y) at the white point of the liquid crystal display is reduced to ±0.015.

Figure 2:
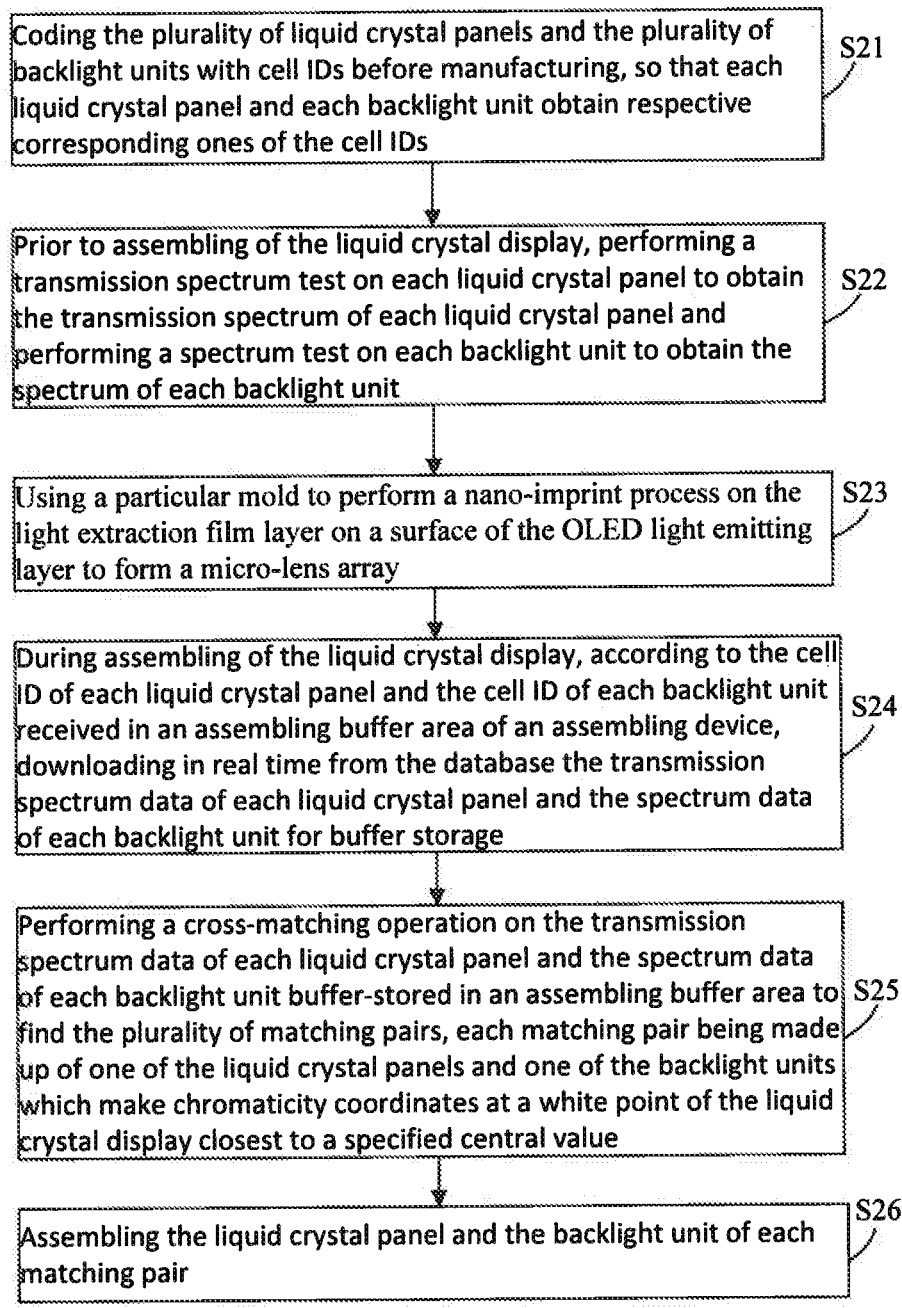
FIG. 2 is a process flow diagram illustrating the chromaticity optimization method for the liquid crystal display according to a second embodiment of the present invention.

Please refer to FIG. 2 which is a process flow diagram illustrating the chromaticity optimization method for the liquid crystal display according to a second embodiment of the present invention. The chromaticity optimization method comprises steps as follows.

step S21: coding a plurality of liquid crystal panels and a plurality of backlight units with cell IDs before manufacturing, so that each liquid crystal panel and each backlight unit obtain respective corresponding ones of the cell IDs;

step S22: prior to assembling of the liquid crystal display, performing a transmission spectrum test on each liquid crystal panel to obtain a transmission spectrum of each liquid crystal panel and performing a spectrum test on each backlight unit to obtain a spectrum of each backlight unit;

step S23: recording and uploading for storage to a database the cell ID and transmission spectrum data of each liquid crystal panel and recording and uploading for storage to the database the cell ID and spectrum data of each backlight unit;

step S24: during assembling of the liquid crystal display, according to the cell ID of each liquid crystal panel and the cell ID of each backlight unit received in an assembling buffer area of an assembling device, downloading in real time from the database the transmission spectrum data of each liquid crystal panel and the spectrum data of each backlight unit for buffer storage;

step S25: during assembling of the liquid crystal display, performing a cross-matching operation on the transmission spectrum data of each liquid crystal panel and the spectrum data of each backlight unit buffer-stored in the assembling buffer area to find a plurality of matching pairs, each matching pair being made up of one of the liquid crystal panels and one of the backlight units which make chromaticity coordinates at a white point of the liquid crystal display closest to a specified central value; and step S26: assembling the liquid crystal panel and the backlight unit of each matching pair.

The transmission spectrum of each liquid crystal panel and the spectrum of each backlight unit are buffer-stored in the assembling buffer area of the assembling device for assembling the liquid crystal display. Therefore, during assembling of the liquid crystal display, according to the transmission spectrum of each liquid crystal panel and the spectrum of each backlight unit which are buffer-stored in the assembling buffer area, the cross-matching operation is performed to obtain the plurality of matching pairs for assembling, and each matching pair is made up of one of the liquid crystal panels and one of the backlight units which make the chromaticity coordinates at the white point of the liquid crystal display closest to the specified central value and are assembled to form the liquid crystal display.

The present embodiment further comprises: after the assembling buffer area receiving a plurality of new liquid crystal panels and a plurality of new backlight units, downloading in real time from the database transmission spectrum data of each new liquid crystal panel and spectrum data of each new backlight unit for buffer storage, according to the cell ID of each new liquid crystal panel and the cell ID of each new backlight unit; then performing step S25, that is, performing the cross-matching operation according to the transmission spectrum data of each new liquid crystal panel and the spectrum data of each new backlight unit which are buffer-stored and thereby obtaining a plurality of matching pairs each making the chromaticity coordinates at the white point of the liquid crystal display closest to the specified central value; and after that, assembling the liquid crystal panel and the backlight unit of each matching pair.

The present invention further provides a liquid crystal display device. The liquid crystal display device is manufactured by using the chromaticity optimization method for the liquid crystal display. The liquid crystal display device may be a display device (e.g. a mobile phone, a tablet, or a television.) for vehicle use, industrial use, or consumer use.

Figure 3:
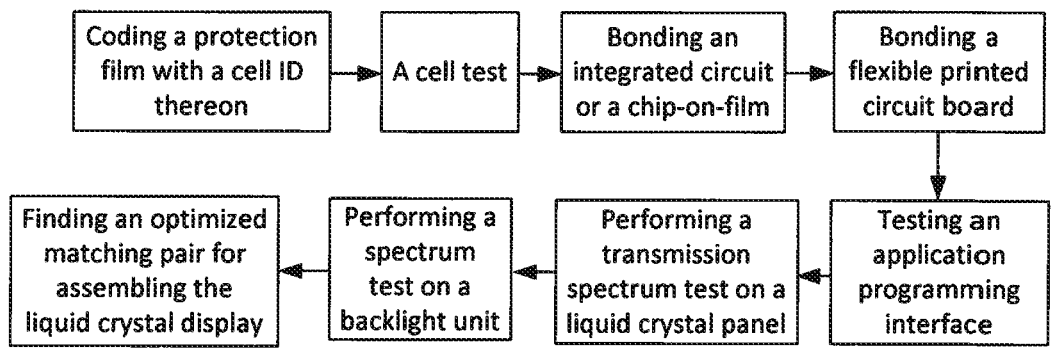
FIG. 3 is a process flow diagram illustrating the manufacture of the liquid crystal display of the present invention.

FIG. 3 is a process flow diagram illustrating manufacturing of the liquid crystal display of the present invention. The manufacturing process flow of the liquid crystal display device is as follows. Coding a protection film with a cell ID thereon→a cell test→bonding an integrated circuit or a chip-on-film (IC/COF Bonding)→bonding a flexible printed circuit board (FPC Bonding)→testing an application programming interface (Panel API Test)→performing a transmission spectrum test on a liquid crystal panel→performing a spectrum test on a backlight unit→finding an optimized matching pair for assembling the liquid crystal display.

Specific improvements are described as follows:

a) Improvement in the manufacturing process flow:

1) Before manufacturing, the liquid crystal panels and the BLUs are coded (i.e. the cell IDs are marked on the protection film) and given one of the cell IDs as identification information;

2) Adding the transmission spectrum test for each liquid crystal panel and the spectrum test for the backlight unit before assembly of the liquid crystal panels and the backlight units;

3) Adding the database with the backstage support function to record data in regard to the cell IDs, the transmission spectrums and the spectrums of the liquid crystal panels and the backlight units;

4) Setting a calculation program in the assembling device used for assembling the liquid crystal panels and the backlight units, and performing the cross-matching operation to find the most suitable one of the spectrums of the backlight units according to the transmission spectrum of the obtained one of the liquid crystal panels, so that the chromaticity coordinates of the liquid crystal display after assembly are closer to the specified central value.

b) Excellent logic for finding the matching pairs:

1) according to the transmission spectrum of each liquid crystal panel and the spectrum of each backlight unit which are buffer-stored in the assembling buffer area of the assembling device used for assembling the liquid crystal display, performing the cross-matching operation to obtain the plurality of optimized matching pairs which make the chromaticity coordinates at the white point of the liquid crystal display closest to the specified central value.

2) After assembling of each optimized matching pair, when the plurality of new liquid crystal panels and the plurality of new backlight units are added to the assembling buffer area, searching and finding from the database the transmission spectrum data of each new liquid crystal panel and the spectrum data of each new backlight unit according to the cell ID of each new liquid crystal panel and the cell ID of each new backlight unit; and then repeat the cross-matching operation in step 1).

c) Database support:

1) It is necessary to upload the measured spectrum data and the cell IDs of the liquid crystal panels and the backlight units to a database terminal;

2) In assembling of the liquid crystal display, according to the cell ID of each of the liquid crystal panels and the backlight units, the corresponding spectrum data are downloaded in real time to the assembling buffer area, so as to perform the optimized matching operation using logic calculation.

Figure 4:
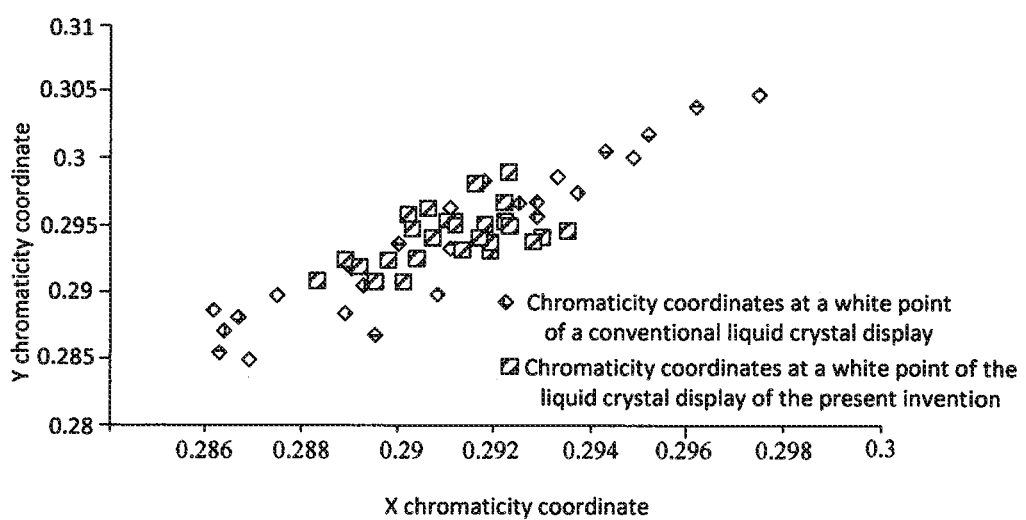
FIG. 4 is a schematic view showing comparison between a conventional liquid crystal display and the liquid crystal display of the present invention in regard to chromaticity coordinates at a white point.

Please refer to FIG. 4, which is a schematic view showing comparison between a conventional liquid crystal display and the liquid crystal display of the present invention in regard to the chromaticity coordinates at the white point. According to FIG. 4, it is appreciated that, the chromaticity coordinates (x, y) at the white point of each liquid crystal display have a tolerance range of ±0.015 after assembly, which is a great improvement compared to a liquid crystal display assembled by using conventional techniques in which the chromaticity coordinates (x, y) at the white point of each liquid crystal display have a tolerance range of ±0.025.

Conventional techniques can only achieve a tolerance range of ±0.025 for the chromaticity coordinates at the white point of the liquid crystal display. As it is difficult to further reduce the chromaticity tolerance, the present invention aims to provide a solution on this problem by looking into different combinations between the liquid crystal panels and the backlight units, and performing the cross-matching operation to get optimized results in the matching pairs each made up of one of the liquid crystal panel and one of the backlight units, so that the chromaticity coordinates (x, y) at the white point of each liquid crystal display have a tolerance range of ±0.015 after the assembly of the liquid crystal display is accomplished. This effectively improves chromaticity errors of the liquid crystal display after the assembly is accomplished and can be implemented in automated production.

The present invention can be manufactured and used in industry with industrial applicability.

What is claimed is:

1. A chromaticity optimization method for a liquid crystal display, the chromaticity optimization method comprising following steps:

coding a plurality of liquid crystal panels and a plurality of backlight units with cell identifications (IDs) before manufacturing, so that each liquid crystal panel and each backlight unit obtain respective corresponding ones of the cell IDs;

prior to assembling of the liquid crystal display, performing a transmission spectrum test on each liquid crystal panel to obtain a transmission spectrum of each liquid crystal panel and performing a spectrum test on each backlight unit to obtain a spectrum of each backlight unit;

recording the cell ID and transmission spectrum data of each liquid crystal panel and recording the cell ID and spectrum data of each backlight unit; and during assembling of the liquid crystal display, performing a cross-matching operation on the transmission spectrum of each liquid crystal panel and the spectrum of each backlight unit to find a plurality of matching pairs for assembling, each matching pair made up of one of the liquid crystal panels and one of the backlight units which make chromaticity coordinates at a white point of the liquid crystal display closest to a specified central value;

wherein the cross-matching operation comprises: obtaining the transmission spectrum of each liquid crystal panel; when the transmission spectrum of one of the liquid crystal panels is determined to be within a first transmission spectrum range, matching this liquid crystal panel with one of the backlight units whose spectrum is within a second spectrum range; when the transmission spectrum of one of the liquid crystal panels is determined to be within a predetermined standard transmission spectrum range, matching this liquid crystal panel with one of the backlight units whose spectrum is within a predetermined standard spectrum range; when the transmission spectrum of one of the liquid crystal panels is determined to be within a second transmission spectrum range, matching this liquid crystal panel with one of the backlight units whose spectrum is within a first spectrum range;

wherein the first transmission spectrum range is higher than the predetermined standard transmission spectrum range, the predetermined standard transmission spectrum range is higher than the second transmission spectrum range, the first spectrum range is higher than the predetermined standard spectrum range, and the predetermined standard spectrum range is higher than the second spectrum range.

2. The chromaticity optimization method for the liquid crystal display according to claim 1, the chromaticity optimization method further comprising:
  searching and finding from the database the transmission spectrum of an obtained one of the liquid crystal panels according to its cell ID;
  when the transmission spectrum of the obtained one of the liquid crystal panels is determined to be within the first transmission spectrum range, searching and finding from the database the corresponding backlight unit whose spectrum is within the second spectrum range, and according to the spectrum of the corresponding backlight unit, searching and finding from the database the cell ID of the corresponding backlight unit so as to assemble the obtained one of the liquid crystal panels and the corresponding backlight unit to form the liquid crystal display;
  when the transmission spectrum of the obtained one of the liquid crystal panels is determined to be within the predetermined standard transmission spectrum range, searching and finding from the database the corresponding backlight unit whose spectrum is within the predetermined standard spectrum range, and according to the spectrum of the corresponding backlight unit, searching and finding from the database the cell ID of the corresponding backlight unit so as to assemble the obtained one of the liquid crystal panels and the corresponding backlight unit to form the liquid crystal display; and
  when the transmission spectrum of the obtained one of the liquid crystal panels is determined to be within the second transmission spectrum range, searching and finding from the database the corresponding backlight unit whose spectrum is within the first spectrum range, and according to the spectrum of the corresponding backlight unit, searching and finding from the database the cell ID of the corresponding backlight unit so as to assemble the obtained one of the liquid crystal panels and the corresponding backlight unit to form the liquid crystal display;
  wherein the first transmission spectrum range is higher than the predetermined standard transmission spectrum range, the predetermined standard transmission spectrum range is higher than the second transmission spectrum range, the first spectrum range is higher than the predetermined standard spectrum range, and the predetermined standard spectrum range is higher than the second spectrum range.

3. The chromaticity optimization method for the liquid crystal display according to claim 1, the chromaticity optimization method further comprising:
  during assembling of the liquid crystal display, according to the cell ID of each liquid crystal panel and the cell ID of each backlight unit received in an assembling buffer area of an assembling device, downloading in real time from the database the transmission spectrum data of each liquid crystal panel and the spectrum data of each backlight unit for buffer storage;
  performing a cross-matching operation according to the transmission spectrum data of each liquid crystal panel and the spectrum data of each backlight unit buffer-stored in the assembling buffer area and thereby obtaining a plurality of matching pairs, each matching pair being made up of one of the liquid crystal panels and one of the backlight units which make the chromaticity coordinates at the white point of the liquid crystal display closest to the specified central value; and
  assembling the liquid crystal panel and the backlight unit of each matching pair.

4. The chromaticity optimization method for the liquid crystal display according to claim 3, further comprising:
  after the assembling buffer area receives a plurality of new liquid crystal panels and a plurality of new backlight units, downloading in real time from the database the transmission spectrum data of each new liquid crystal panel and the spectrum data of each new backlight unit for buffer storage, according to the cell ID of each new liquid crystal panel and the cell ID of each new backlight unit; and
  performing the cross-matching operation according to the transmission spectrum data of each liquid crystal panel and the spectrum data of each backlight unit buffer-stored in the assembling buffer area and thereby obtaining a plurality of matching pairs, each matching pair including one of the liquid crystal panels and one of the backlight units which make the chromaticity coordinates at the white point of the liquid crystal display closest to the specified central value.

5. A chromaticity optimization method for a liquid crystal display, the chromaticity optimization method comprising:
  during assembling of the liquid crystal display, performing a cross-matching operation on a transmission spectrum of each of a plurality of liquid crystal panels and a spectrum of each of a plurality of backlight units and thereby obtaining a plurality of matching pairs for assembling, each matching pair comprising one of the liquid crystal panels and one of the backlight units which make chromaticity coordinates at a white point of the liquid crystal display closest to a specified central value, wherein the chromaticity optimization method further comprises: according to the transmission spectrum of each liquid crystal panel and the spectrum of each backlight unit which are buffer-stored in an assembling buffer area of an assembling device for assembling the liquid crystal display, performing a cross-matching operation to obtain a plurality of matching pairs for assembling of the liquid crystal display, each matching pair comprising one of the liquid crystal panels and one of the backlight units which make the chromaticity coordinates at the white point of the liquid crystal display closest to the specified central value.

6. The chromaticity optimization method for the liquid crystal display according to claim 5, the cross-matching operation further comprising:
  obtaining the transmission spectrum of each liquid crystal panel; when the transmission spectrum of an obtained one of the liquid crystal panels is determined to be within a first transmission spectrum range, matching this liquid crystal panel with one of the backlight units whose spectrum is within a second spectrum range; when the transmission spectrum of the obtained one of the liquid crystal panels is determined to be within a predetermined standard transmission spectrum range, matching this liquid crystal panel with one of the backlight units whose spectrum is within a predetermined standard spectrum range; and when the transmission spectrum of the obtained one of the liquid crystal panels is determined to be within a second transmission spectrum range, matching this liquid crystal panel with one of the backlight units whose spectrum is within the first spectrum range;
  wherein the first transmission spectrum range is higher than the predetermined standard transmission spectrum range, the predetermined standard transmission spectrum range is higher than the second transmission spectrum range, the first spectrum range is higher than the predetermined standard spectrum range, and the predetermined standard spectrum range is higher than the second spectrum range.

7. The chromaticity optimization method for the liquid crystal display according to claim 5, the chromaticity optimization method further comprising: uploading for storage to a database a cell ID and transmission spectrum data of each liquid crystal panel, and uploading for storage to the database a cell ID and spectrum data of each backlight unit; during assembling of the liquid crystal display, according to the cell ID of each liquid crystal panel, downloading from the database the corresponding transmission spectrum data, and according to the cell ID of each backlight unit, downloading from the database the corresponding spectrum data, and performing a cross-matching operation on the transmission spectrum data of each liquid crystal panel and the spectrum data of each backlight unit.

8. The chromaticity optimization method for the liquid crystal display according to claim 5, the chromaticity optimization method further comprising:

coding each liquid crystal panel and each backlight unit with cell IDs before manufacturing, so that each liquid crystal panel and each backlight unit obtain respective corresponding ones of the cell IDs;

prior to assembling of the liquid crystal display, performing a transmission spectrum test on each liquid crystal panel to obtain the transmission spectrum of each liquid crystal panel and performing a spectrum test on each backlight unit to obtain the spectrum of each backlight unit; and recording the cell ID and transmission spectrum data of each liquid crystal panel and recording the cell ID and spectrum data of each backlight unit.

9. The chromaticity optimization method for the liquid crystal display according to claim 8, the chromaticity optimization method further comprising:

uploading for storage to a database the cell ID and the transmission spectrum data of each liquid crystal panel and uploading for storage to the database the cell ID and the spectrum data of each backlight unit;

searching and finding from the database the transmission spectrum of an obtained one of the liquid crystal panels according to its cell ID;

when the transmission spectrum of the obtained one of the liquid crystal panels is determined to be within a first transmission spectrum range, searching and finding from the database the corresponding backlight unit whose spectrum is within a second spectrum range, and according to the spectrum of the corresponding backlight unit, searching and finding from the database the cell ID of the corresponding backlight unit so as to assemble the obtained one of the liquid crystal panels and the corresponding backlight unit to form the liquid crystal display;

when the transmission spectrum of the obtained one of the liquid crystal panels is determined to be within the predetermined standard transmission spectrum range, searching and finding from the database the corresponding backlight unit whose spectrum is within the predetermined standard spectrum range, and according to the spectrum of the corresponding backlight unit, searching and finding from the database the cell ID of the corresponding backlight unit so as to assemble the obtained one of the liquid crystal panels and the corresponding backlight unit to form the liquid crystal display; and when the transmission spectrum of the obtained one of the liquid crystal panels is determined to be within the second transmission spectrum range, searching and finding from the database the corresponding backlight unit whose spectrum is within the first spectrum range, and according to the spectrum of the corresponding backlight unit, searching and finding from the database the cell ID of the corresponding backlight unit so as to assemble the obtained one of the liquid crystal panel and the corresponding backlight unit to form the liquid crystal display;

wherein the first transmission spectrum range is higher than the predetermined standard transmission spectrum range, the predetermined standard transmission spectrum range is higher than the second transmission spectrum range, the first spectrum range is higher than the predetermined standard spectrum range, and the predetermined standard spectrum range is higher than the second spectrum range.

10. The chromaticity optimization method for the liquid crystal display according to claim 5, the chromaticity optimization method further comprising:

(i): coding the plurality of liquid crystal panels and the plurality of backlight units with cell IDs before manufacturing, so that each liquid crystal panel and each backlight unit obtain respective corresponding ones of the cell IDs;

(ii): prior to assembling of the liquid crystal display, performing a transmission spectrum test on each liquid crystal panel to obtain the transmission spectrum of each liquid crystal panel and performing a spectrum test on each backlight unit to obtain the spectrum of each backlight unit;

(iii): recording and uploading for storage to a database the cell ID and transmission spectrum data of each liquid crystal panel and recording and uploading for storage to the database the cell ID and spectrum data of each backlight unit;

(iv): during assembling of the liquid crystal display, according to the cell ID of each liquid crystal panel and the cell ID of each backlight unit received in an assembling buffer area of an assembling device, downloading in real time from the database the transmission spectrum data of each liquid crystal panel and the spectrum data of each backlight unit for buffer storage;

(v): during assembling of the liquid crystal display, performing a cross-matching operation according to the transmission spectrum data of each liquid crystal panel and the spectrum data of each backlight unit bufferstored in the assembling buffer area to find the plurality of matching pairs, each matching pair being made up of one of the liquid crystal panels and one of the backlight units which make the chromaticity coordinates at the white point of the liquid crystal display closest to the specified central value; and (vi): assembling the liquid crystal panel and the backlight unit of each matching pair.

11. The chromaticity optimization method for the liquid crystal display according to claim 10, the chromaticity optimization method further comprising:

(vii): after the assembling buffer area receives a plurality of new liquid crystal panels and a plurality of new backlight units, downloading in real time from the database the transmission spectrum data of each new liquid crystal panel and the spectrum data of each new backlight unit for buffer storage, according to the cell ID of each new liquid crystal panel and the cell ID of each new backlight unit; and then performing step (v).

12. A liquid crystal display device, wherein a liquid crystal display of the liquid crystal display device is manufactured by using a chromaticity optimization method for the liquid crystal display, the chromaticity optimization method comprising:

during assembling of the liquid crystal display, performing a cross-matching operation on a transmission spectrum of each of a plurality of liquid crystal panels and a spectrum of each of a plurality of backlight units to find a plurality of matching pairs for assembling, each matching pair being made up of one of the liquid crystal panels and one of the backlight units which make chromaticity coordinates at a white point of the liquid crystal display closest to a specified central value, wherein the chromaticity optimization method further comprises: according to the transmission spectrum of each liquid crystal panel and the spectrum of each backlight unit which are buffer-stored in an assembling buffer area of an assembling device for assembling the liquid crystal display, performing a cross-matching operation to obtain a plurality of matching pairs for assembling of the liquid crystal display, each matching pair comprising one of the liquid crystal panels and one of the backlight units which make the chromaticity coordinates at the white point of the liquid crystal display closest to the specified central value.

13. The liquid crystal display device according to claim 12, wherein the chromaticity coordinates (x, y) at the white point of the liquid crystal display have a tolerance range of ±0.015.

* * * * *